United States Patent [19]

Kano et al.

[11] Patent Number: 4,984,285

[45] Date of Patent: Jan. 8, 1991

[54] METHOD OF CORRECTING SHADING PHENOMENON IN OPTICAL CHARACTER READER

[75] Inventors: Mitsunari Kano, Seto; Toshirou Uemura, Nagoya, both of Japan

[73] Assignee: Hitachi, Ltd., Tokyo, Japan

[21] Appl. No.: 225,814

[22] Filed: Jul. 29, 1988

[30] Foreign Application Priority Data

Aug. 26, 1987 [JP] Japan .................. 62-210050

[51] Int. Cl.$^5$ .............................................. G06K 9/38
[52] U.S. Cl. ...................... 382/50; 358/163; 358/461; 358/466; 382/65
[58] Field of Search ............... 382/50, 53, 48, 20, 382/65; 358/461, 465, 466, 163

[56] References Cited

U.S. PATENT DOCUMENTS

| | | | |
|---|---|---|---|
| 3,872,434 | 3/1975 | Duvall et al. | 382/50 |
| 3,962,681 | 6/1976 | Requa et al. | 382/50 |
| 4,408,231 | 10/1983 | Bushaw et al. | 382/50 |
| 4,491,961 | 1/1985 | Sutton et al. | 382/50 |

FOREIGN PATENT DOCUMENTS 58-121864 7/1983 Japan.
60-98765 6/1985 Japan.

Primary Examiner—Leo H. Boudreau
Assistant Examiner—Joseph Mancuso
Attorney, Agent, or Firm—Antonelli, Terry, Stout & Kraus

[57] ABSTRACT

An optical character reader apparatus includes an image sensor, and a background reflection plate having such reflectivity which allows the image sensor to detect the entry of a document carrying thereon image information such as characters, graphics or the like within the field of view of the image sensor. A method of correcting a shading phenomenon comprises steps of setting a scan timing period of the image sensor at a first scan period, reading the reflection plate with the first scan period, setting the scan timing period of image sensor at a second scan period which is shorter than the first scan period, transporting the document in the field of view of the image sensor, detecting periphery of the document under the timing corresponding to the second scan period, cutting out image information on the document on the basis of the detected periphery thereof, correcting the cut out image information with respect to the shading with reference to the image sensor output derived through reading operation under the timing corresponding to the first scan period, and recognizing the image data undergone the correction of the shading.

2 Claims, 4 Drawing Sheets

METHOD OF CORRECTING SHADING PHENOMENON IN OPTICAL CHARACTER READER

BACKGROUND OF THE INVENTION

The present invention generally relates to an optical character reader (OCR) apparatus. More particularly, the invention is concerned with a shading correcting method advantageously suited for use in correcting non-uniformity in the sensitivity of an image reader head (also referred to as image sensor) of the OCR apparatus.

In the OCR apparatus, reading of such a document having a uniform density may nevertheless result in non-uniformity in the output level of the image sensor signal generated through photoelectrical conversion of the document information. Particularly, there is observed a phenomenon in which the output level of the sensor signal produced at both sides of the document tends to become lower than the sensor output produced at the center portion of the document, whereby non-uniformity in density appears in the image information of the document as a whole. This phenomenon is known as the shading phenomenon. As the causes for the shading phenomenon, the following may typically be mentioned.

(1) Non-uniformity and variation in illuminance of a document illuminating lamp:

Typically, a fluorescent lamp is employed as a document illuminating lamp. In this case, because of a finite length of the lamp as well as inherently lower luminance of light emitted at both ends of the lamp than at the center portion due to light emitting mechanism of this sort of lamp, the illuminance is decreased at both ends of the lamp. Additionally, blackening occurs at both ends of the fluorescent lamp in the course of the use to provide non-uniformity and variation in the distribution of illuminance. Additionally, the manner of mounting the fluorescent lamp may provide a cause for such undesirable phenomenon.

(2) Attenuation of light intensity by the lens of optical system:

The quantity of light transmitted through a lens of an optical system is decreased at a peripheral portion according to a cosine biquadrate law. By way of example, at a half-circle angle of 20°, the quantity of light at the peripheral portion of the lens is decreased to 78% of the quantity of light at the center portion thereof.

(3) Non-uniformity in the sensitivity among photoelectric conversion elements:

The solid-state imaging elements such as those of a charge-coupled device (CCD) and photo-electric conversion element of a diode array are likely to exhibit non-uniform distribution of sensitivity due to tolerances involved in manufacture and fabrication.

Correction of the shading phenomenon in the OCR has heretofore been carried out by reading at first a white reflecting plate providing "white" reference before the reading of a document and storing the derived data as the reference data to be utilized later for correcting the shading phenomenon of the image data resulting from the document reading operation.

In the prior art document transport type OCR apparatus, the image reader head or image sensor is designed to scan constantly a same field of view through which the document is transported. In the case of the document transport type OCR apparatus, it is required for the correction of the shading phenomenon, i.e. correction of the non-uniformity in the output of the image sensor, to read at first the white reference by other means because of the absence of an operation for causing the image sensor to read first the white reference and then shifting the field of view to the document as with the case of a document fixed type (i.e. sensor moving type) OCR apparatus. In connection with the document handled by the OCR apparatus, it is noted that a sheet or paper of the document is usually printed with a format designating the positions of characters to be printed or scribed. Under the circumstances, the cut-out of the character images to be read out is performed with reference to the periphery of the document. To this end, the OCR apparatus is provided with a plate printed in black or a planar mirror (equivalent to the black plate because of the absence of illuminating light rays in the direction normal to the plane of the mirror) as a background for the field of view of the image reader head (image sensor) so that the periphery of a document can be detected when the document (having a white peripheral portion) enters the field of view.

For effectuating correction of the shading phenomenon for the output of the image reader head of the document transport type OCR apparatus, a white reflection plate providing the white reference is first moved into the field of view of the image reader head for thereby deriving a reference shading waveform (i.e. waveform serving as a reference for correcting the shading of image information). Thereafter, the white reflection plate is removed from the field of view of the reader head, whereupon the entry of a document to be processed is awaited for with the background being set in black.

The insertion and removal of the white reflector plate has heretofore been realized mechanically with the aid of a mechanism of a complicated structure including mechanical elements, a solenoid-type actuator, a power driver circuit and others.

A typical one of the prior art OCR Apparatus described above is disclosed in Japanese Patent Laid-Open No. 109975/1983 (JP-A-53-109975). Further, as the shading correction technique in the OCR apparatus, there may be mentioned those disclosed in JP-A-61-246890, JP-A-61-224781, JP-A-61-121181, JP-A-60-98765, JP-A-58-121864 and JP-A-59-193669.

SUMMARY OF THE INVENTION

An object of the present invention is to provide a method of correcting the shading phenomenon taking place in a document transport type OCR apparatus which method is capable of reading a reference waveform to be utilized in correcting the shading phenomenon of the output of an image reader head or sensor and capable of detecting the periphery of a document without need for employment of any mechanical means.

According to a general aspect of the present invention, the abovementioned object can be achieved by using a single reflection plate for detecting the peripheral of the document and as a reflection plate in deriving a reference shading waveform to be utilized for correcting the shading phenomenon from which the image information suffers.

According to a preferred embodiment of the invention, the scan period of the image reader head or image sensor is lengthened upon reading of the reference shading waveform to be used for the correction of the shading phenomenon.

According to another aspect of the invention, the quantity of light illuminating the reflection plate may be increased upon reading the reference shading waveform for correcting the shading phenomenon.

More specifically, a reflector plate having a low reflectivity required for detecting the periphery of a document is also used as the background for deriving the reference shading waveform by simply changing over the operation modes of the image reader head, thereby making it possible to read out the reference shading waveform and the peripheral shape of the document without the need for a mechanical operation.

With the change-over of the operation modes of the image reader head (image sensor), it is intended to enhance the output of the image reader head produced upon detection of the reflector plate having a low reflectivity to a level equivalent to that produced by the reader head upon detection of a blank portion of the document. More specifically, when the reflector plate which appears in black in the ordinary document reading operation is employed as the means for deriving the white reference level to be utilized in correcting the shading phenomenon, the output level of the image reader head produced upon reading the reflector plate is decreased to a fraction of the output level produced upon reading the document. For this reason, it is taught by the present invention to change over the operation mode of the image reader head upon reading the reference waveform for correcting the shading phenomenon so that enhancement of sensitivity of the image reader head can be equivalently realized.

DESCRIPTION OF THE PREFERRED EMBODIMENTS

Now, the present invention will be described in detail in conjunction with exemplary embodiments thereof by reference to the drawings.

Figure 1:
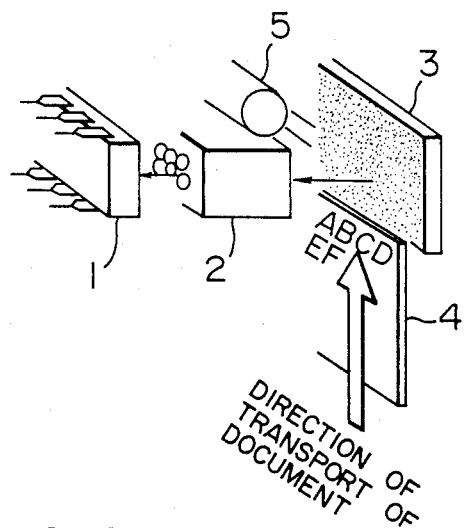
FIG. 1 is a view showing a general arrangement of an OCR apparatus to which the present invention can be applied.

FIG. 1 shows a general arrangement of an optical character reader or OCR apparatus to which the invention is to be applied. In this figure, a reference numeral 1 denotes an image sensor which may be constituted by CCD, MOS sensor or the like, 2 denotes a lens, 3 denotes a background reflection plate, 4 denotes a document such as slip, note, manuscript or the like, and numeral 5 denotes an illuminator including a fluorescent lamp or the like. The background reflection plate 3 is made of a material having a sufficiently low reflectivity (reflection factor) when compared with that of a paper sheet of the document 4. Typically, the reflectivity of the background reflection plate 3 may be one third of that of the paper sheet of the document.

In the ordinary stand-by state, the image sensor 1 detects the background reflection plate 3 illuminated by the illuminator 5 through the lens 2. Upon a reading operation, a document 4 to be read is transported in the direction indicated by an arrow in FIG. 1. In the course of transportation of the document 4, the periphery thereof is detected while characters A, B, C, etc. and others on the document 4 are individually read out, being cut out with reference to the periphery. The detection of the periphery of the document 4 can be readily realized due to high contrast between the paper sheet of the document 4 and the background reflection plate 3.

An operation for correcting the shading phenomenon is carried out prior to the document reading operation.

Before entering into detailed description of the exemplary embodiment, the principle underlying the present invention will be elucidated.

Figure 2A:
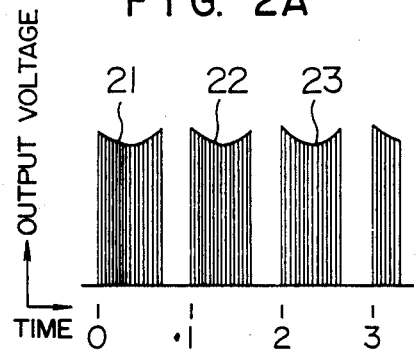
FIG. 2A is a view illustrating the output signal waveform of an image sensor (image reader head) produced upon reading a blank portion of a document.

FIG. 2A illustrates the output signal of the image sensor produced upon reading blank portions of the paper sheet of the document 4. In succession to the scan start timing signals at time points 0, 1, 2 and so forth, sensor output pulse trains 21, 22, 23 and 24 and so forth, are respectively produced. As will be seen in FIG. 2A, concavity is observed in each of the pulse trains most significantly at the mid portion thereof. This concavity in the pulse train demonstrates that nonuniformity is present in the distribution of illumination and/or sensitivity of the image sensor. The overall waveform of the pulse train produced upon each scan remains the same so long as the same blank portion of the document is detected.

Figure 3:
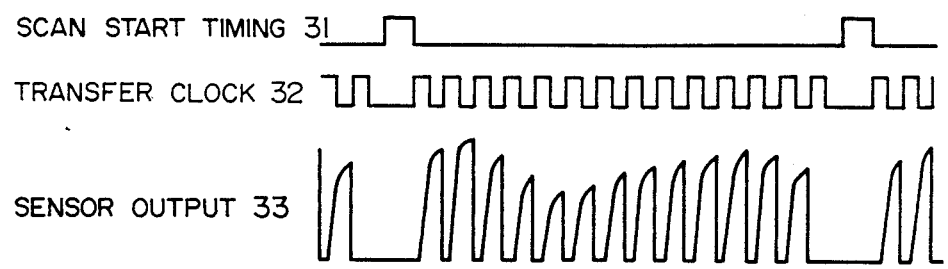
FIG. 3 illustrates in a time chart relation between the output pulse train of the image sensor, a scan start timing signal and a transfer clock signal.

FIG. 3 illustrates in a time chart generation of the sensor output pulses. In this figure, reference numeral 31 designates a scan start timing signal, 32 designates a transfer clock signal, and 33 designates the output voltage signal of the image sensor. By way of example, it is assumed that a CCD image sensor is used. In that case, the internal CCD circuit of the image sensor is activated by the scan start timing signal 31, whereby photoelectric charges stored in the individual pixels of the light receiving part of the sensor are sequentially outputted in the form of voltages as indicated at 21 in FIG. 2A.

Figure 4:
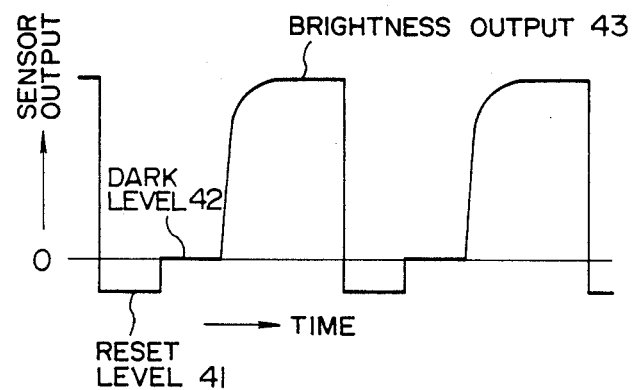
FIG. 4 is a waveform diagram illustrating in detail the output pulse waveform of the image sensor.

Here, the waveform of the image sensor output signal 33 will be considered in more detail by referring to FIG. 4.

In the case of the CCD image sensor, a reset level 41 makes appearance at first for resetting the output to a predetermined value. Subsequently, a dark level 42 representative of the quiescent output state makes appearance, which is then followed by the appearance of a brightness output 43 due to the electric charge stored in a pixel of the light receiving part of the image sensor. The brightness output 43 is again reset for allowing the corresponding signal to be output from the succeeding pixel.

Of the signal components mentioned above, the dark level 41 and the brightness output 43 are required for reading the reference waveform of the shading. However, the dark level 42 varies in dependence on the temperature while ringing may take place in the reset level 41 when the image sensor is driven at a high speed, making it difficult or impossible to derive definitely the dark level. Accordingly, in order to accomplish the correction of the shading phenomenon with high accuracy, it is necessary to read the reference shading waveform by enhancing the brightness output 43 as much as possible.

Figure 2B:
FIG. 2B is a view illustrating the output signal waveform of the image sensor produced upon reading a background reflector plate.

FIG. 2B shows the output signal of the image sensor upon detection of the background reflection plate 3.

Since the background plate 3 is imparted with a sufficiently low reflectivity when compared with that of the paper sheet of the document 4 with a view to enabling detection of the entry thereof within the field of view of the image sensor, (e.g. the reflection factor of the former may be one third of that of the latter), magnitude of the image sensor outputs 24, 25, 26 and so forth produced upon detection of the background reflection plate 3 is, for example, about one third of the sensor outputs 21, 22, 23 and so forth produced upon detection of the paper sheet of the document 4 shown in FIG. 2A.

Figure 5:
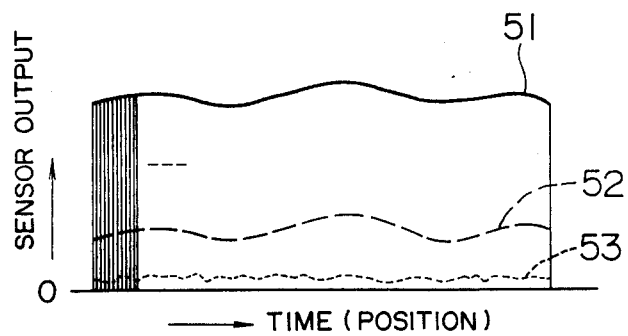
FIG. 5 is a view for illustrating relation among the sensor output waveform produced upon reading a black portion of a document, the sensor output waveform produced upon reading a background reflector plate and a waveform of noise level.

Now, relation between the sensor output waveform produced upon detection of the blank portion of the document and the sensor output waveform produced upon detection of the background reflection plate will be considered by reference to FIG. 5, in which reference numeral 51 designates the image sensor output signal upon detection or reading of the blank portion of a document, 52 designates the sensor output produced upon reading of the background reflection plate 3 having the sufficiently low reflectivity when compared with that of the paper sheet of the document (e.g. ⅓ of the latter), and numeral 53 designates a noise level appearing in the sensor output. On these conditions, it is impossible to correct the shading effect with high accuracy by utilizing the sensor output 52 produced upon reading the background reflection plate, because the S/N ratio will then be significantly degraded. More specifically, the ratio of noise contained in the image sensor output such as offset component, high-frequency spike component and the like is increased, resulting in a degradation in the accuracy of the shading correction.

Since the noise level 53 contains the components which vary as a function of temperature, time lapse and others, it is necessary to increase the sensor output when compared with the noise level for accomplishing the shading correction with high accuracy.

If the noise level is of DC value undergoing no variation, no problem concerning noise can be solved by subtracting at first the noise level from the sensor output. However, the noise level does vary by nature, and thus it is impossible to cancel out noise through subtraction as mentioned above.

In contrast, the sensor output signal 51 produced upon reading the black portion of the document is sufficiently high when compared with the noise level 53 due to a lot of reflected light rays and thus has a high S/N ratio. Accordingly, the accuracy of the shading correction can be increased by making use of the sensor output signal 51 produced upon reading the blank portion of the document.

The present invention teaches that the scan period of the image sensor is extended (e.g. by a factor of three) upon a reading of the background reflection plate with a view to obtaining the amplitude of the image sensor output signal equivalent to the amplitude obtained upon reading the blank portion of the document.

Figure 2C:
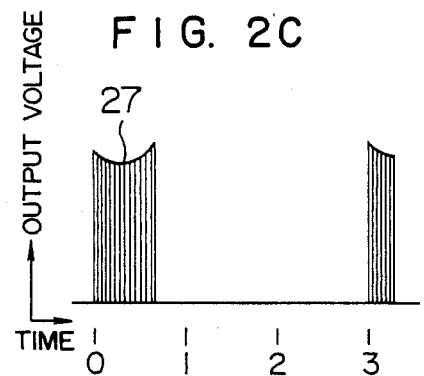
FIG. 2C is a view illustrating the output signal waveform of the image sensor produced upon reading the background reflector plate by trebling the scan period of the image sensor.

More specifically, assuming that the scan period of the image sensor is extended by a factor of three upon reading the blank portion of the document, there is produced a sensor output signal of the amplitude thrice as high as that of the sensor output shown in FIG. 2A at every third scan timing signal, as is illustrated in FIG. 2C. By utilizing this sensor output signal having the tripled amplitude as the reference waveform, correction of the shading phenomenon can be realized with high accuracy.

Figure 6:
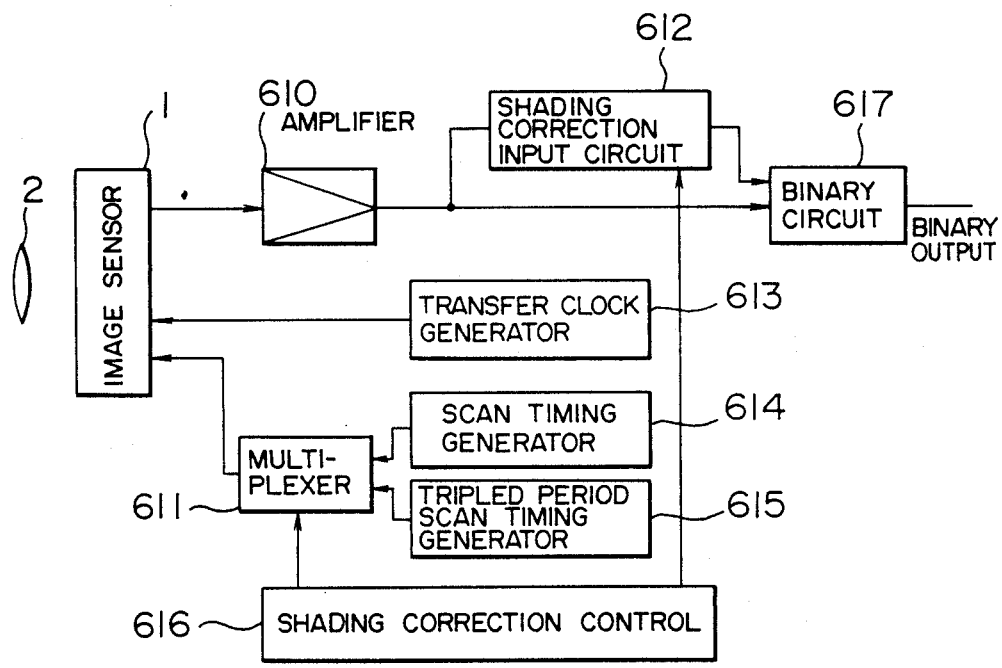
FIG. 6 is a block diagram showing a general arrangement of an image sensor driver circuit which can be employed in carrying out the invention.

Next, description will be made of a circuit for driving the image sensor by referring to FIG. 6.

The image sensor driver shown in this figure is composed of a transfer clock signal generator 613 for generating a transfer clock pulse signal for the image sensor having a requisite pulse width and a period by dividing frequency of an output signal generated by a stable oscillator such as crystal oscillator by means of a counter circuit (not shown), a scan timing generator 614 for generating a scan timing signal for periodically triggering the scan operation of the image sensor, and a tripled period scan timing signal generator 615 for generating a scan timing signal of the tripled period as required in the operation for generating the reference shading waveform required for correcting the shading phenomenon. The tripled period scan timing generator circuitry 615 includes a counter (not shown) for counting the time duration which is thrice as long as the scan timing in the ordinary document reading operation. In the case where the image sensor 1 is constituted by a MOS image sensor, the scan start signal is a pulse for activating internal analogue switches. On the other hand, in the case of the CCD image sensor, the scan start signal is a transfer gate signal for transferring the electric charges stored in the light receiving part to the internal CCD. Of these scan timing generators 614 and 615, the tripled period scan timing generator circuit 615 is selected in precedence to the reading of the document under the control of a shading correction control circuitry 616.

With the circuit arrangement of the image sensor driver described above, it is assumed that the image sensor 1 is now detecting the background reflection plate 3. At that time, the output of the image sensor would be naturally low because of low reflectivity of the background plate. However, scanning of the background reflection plate 3 is performed with a scan period thrice as long as that of the document scanning operation according to the teaching of the invention, whereby the detection signal of magnitude comparable to that resulting from the document scanning is produced at the output of the image sensor due to, so to say, a sensitization effect brought about by the lengthened scanning period. Upon completion of the shading correcting operation by the shading correcting input circuit 612, the shading correction control circuit 616 selects the scan timing generator 614 for the ordinary document reading operation by changing over correspondingly the multiplexer 611. Parenthetically, an amplifier circuit 610 serves to amplify the output signal of the image sensor 610. Further, a binary circuit 617 functions to convert the output signal of the image sensor 1 into a binary signal.

Figure 7:
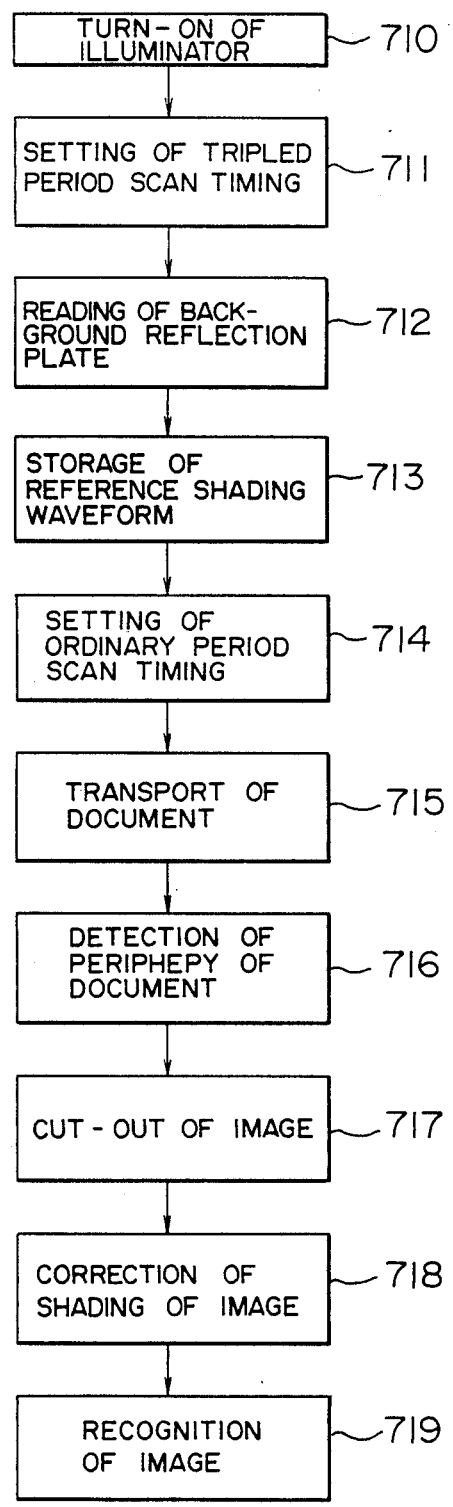
FIG. 7 is a flow chart illustrating operation for correcting the shading phenomenon according to an embodiment of the present invention.

Now, operation for the shading correction will be elucidated in more detail by referring to FIG. 7.

At first, the illuminator 5 is turned on (step 710).

Subsequently, the trebled period scan timing signal generator 615 is selected by the multiplexer 611 to establish the scan period of the duration thrice as long as that of the ordinary document scan timing (step 711). Under the scan timing of the trebled period, detection or reading of the background reflection plate 3 is performed by the image sensor 2 (step 712). The output of the image sensor as derived in the course of this background reading operation is stored as the shading reference waveform (step 713).

Next, the scan timing generator 614 is selected by means of the multiplexer 611 for setting the ordinary scan timing period (step 714), whereupon the entry of a document is waited for (step 715), being followed by detection of the periphery of the document at a step 716. Subsequently, on the basis of the periphery data of the document as detected, images of characters, patterns and others on the document are cut out (step 717).

The images as cut out are corrected in respect to the shading phenomenon with the aid of the reference shading waveform stored at the step 713 mentioned above (step 718). The images corrected in respect to the shading are recognized (step 719).

Since the correction of the shading is conducted by utilizing the image sensor output having a large amplitude, the shading correction can be accomplished with enhanced accuracy.

Besides, because the changing-over between the ordinary period scan timing generator 614 and the treble period scan timing generator 615 is realized electrically, no mechanical operation for this end is required.

It should be mentioned that the sensitization (enhancement of the sensitivity) realized by lengthening the scan period can also be realized by trebling the period of the clock signal for operating the image sensor driver circuit as a whole.

Instead of sensitization of the image sensor itself, the intensity of illumination may be trebled to derive the similar shading waveform output.

As will be appreciated from the foregoing description, it is now possible according to the teaching of the present invention to correct with enhanced accuracy the shading phenomenon, i.e. the nonuniformity in the sensitivity of the image reader head, in addition to the detection of the periphery of documents in the document transport type optical character reader (OCR) without resorting to any mechanical operation. Thus, there can be accomplished reduction in cost and heat generation, high reliability of operation, and speed-up of operation of the OCR apparatus.

we claim:

1. In an optical character reader apparatus including an image sensor, and a background reflection plate having such reflectivity which allows said image sensor to detect the entry of a document carrying thereon image information within the field of view of said image sensor,
   a method of correcting a shading phenomenon, comprising steps of:
   setting a scan timing period of said image sensor at a first scan period;
   reading said background reflection plate with said first scan period;
   setting the scan timing period of said image sensor at a second scan period which is shorter than said first scan period;
   transporting said document into the field of view of said image sensor;
   detecting external shape of said document under the timing corresponding to said second scan period;
   cutting out image information on said document on the basis of the detected external shape thereof;
   correcting the cut out image information with respect to the shading with reference to the image sensor output derived through the reading operation under the timing corresponding to said first scan period, and
   recognizing the image data having undergone the correction of the shading.

2. A method of correcting a shading phenomenon according to claim 1, wherein the output of said image sensor produced upon said reading of said background reflection plate with said first scan period is set to be substantially equal to the output of said image sensor produced upon reading of a blank portion of said document where said image information is absent.

* * * * *